United States Patent
Hohmann et al.

(10) Patent No.: US 12,546,451 B2
(45) Date of Patent: Feb. 10, 2026

(54) LIGHTING DEVICE FOR VEHICLES

(71) Applicant: HELLA GmbH & Co. KGaA, Lippstadt (DE)

(72) Inventors: Carsten Hohmann, Warstein (DE); Katrin Hunecke, Bad Sassendorf (DE); Yves Alexander Leier, Lippstadt (DE); Michael Schoene, Lippstadt (DE); Sophia Sieding, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/911,029

(22) Filed: Oct. 9, 2024

(65) Prior Publication Data

US 2025/0116384 A1   Apr. 10, 2025

(30) Foreign Application Priority Data

Oct. 9, 2023 (DE) ............... 10 2023 127 403.1

(51) Int. Cl.
*F21S 41/24* (2018.01)
*F21S 43/241* (2018.01)
*F21S 43/242* (2018.01)
*F21W 103/40* (2018.01)

(52) U.S. Cl.
CPC ............. *F21S 41/24* (2018.01); *F21S 43/241* (2018.01); *F21S 43/246* (2024.05); *F21W 2103/40* (2018.01)

(58) Field of Classification Search
CPC ...... F21S 43/243; F21S 43/252; F21S 43/253; F21S 43/246; F21S 43/241; F21S 43/24; F21W 2103/40
See application file for complete search history.

(56) References Cited

U.S. PATENT DOCUMENTS

| | | | |
|---|---|---|---|
| 2014/0226354 A1* | 8/2014 | Mugge | F21S 43/30 362/511 |
| 2020/0012035 A1* | 1/2020 | Vollmer | F21S 43/239 |

FOREIGN PATENT DOCUMENTS

| | | | |
|---|---|---|---|
| DE | 102013212355 A1 * | 12/2014 | ............ F21S 43/241 |
| DE | 102017105838 A1 * | 9/2018 | ............ F21S 43/241 |
| DE | 102020207459 A1 | 12/2021 | |
| EP | 2354637 A2 | 8/2011 | |

OTHER PUBLICATIONS

Innovation Q+ NPL and Patent Search (Year: 2025).*

\* cited by examiner

*Primary Examiner* — Anabel Ton
(74) *Attorney, Agent, or Firm* — Muncy, Geissler, Olds & Lowe, P.C.

(57) ABSTRACT

A lighting device comprising a first light unit having a light source and a first flat light guide having a linear light coupling surface and a light decoupling surface. A second light unit has a light source and a second flat light guide having a linear light coupling surface and a linear light decoupling surface. The first flat light guide and the second flat light guide are connected to each other in a single piece to form a light guide element. Opposite flat sides of the first light guide and opposite flat sides of the second light guide intersect in an intersection area. The first flat light guide has a deflection section between a first flat section and a second flat section of the first flat light guide. The first flat light guide and the second flat light guide form a U-shaped light guide element in a transverse plane.

14 Claims, 2 Drawing Sheets

LIGHTING DEVICE FOR VEHICLES

This nonprovisional application claims priority under 35 U.S.C. § 119 (a) to German Patent Application No. 10 2023 127 403.1, which was filed in Germany on Oct. 9, 2023, and to German Patent Application No. 10 2023 129 741.4, which was filed in Germany on Oct. 27, 2023, and which are both herein incorporated by reference.

BACKGROUND OF THE INVENTION

Field of the Invention

The invention relates to a lighting device for vehicles comprising a first light unit containing a light source and a first flat light guide having a linear light coupling surface and a light decoupling surface, and comprising a second light unit containing a light source and a second flat light guide comprising a linear light coupling surface and a linear light decoupling surface, wherein the first flat light guide and the second flat light guides are connected to each other in a single piece to form a light guide element, wherein opposite flat sides of the first light guide and opposite flat sides of the second light guide intersect each other in an intersection area, and wherein the first flat light guide has a deflection section between a first flat section and a second flat section of the first flat light guide.

Description of the Background Art

A lighting device for vehicles is known from EP 2 354 637 A2, which is incorporated herein by reference, and which comprises a first light unit and a second light unit, each with a light source and a flat light guide. The flat light guides of the first light unit and the second light unit are connected to each other in a single piece and intersect in an intersection area. The first light unit and the second light unit each have flat light guides, which have a light coupling surface on one narrow side, to which the light is coupled and transmitted via opposite flat sides of the respective flat light guides. While the first flat light guide has a deflection section and a first flat section starting from the intersection area, the second flat light guide is flat and extends in a plane. In this way, a linear light decoupling can be carried out on a side of the second flat light guide opposite the light coupling surface to create a light function. The second light guide has a coupling agent, so that light is decoupled from a front flat side of the same to create a light function. Advantageously, this makes it possible to arrange a linear light function and a two-dimensional light function directly next to each other. It is desirable to arrange enhanced light functions in a space-saving manner.

SUMMARY OF THE INVENTION

It is therefore an object of the present invention is therefore to further develop a lighting device for vehicles with two intersecting flat light guides in such a way that several light functions can be provided in a space-saving manner.

In order to achieve this object, the invention is characterized in that a first flat light guide and a second flat light guide form a U-shaped light guide element in a transverse plane running transversely to the linear light coupling surface of the first light guide and the second light guide, wherein an extension section of the first light guide and an extension section of the second light guide project from the intersection area at an angle.

An advantage of the invention is that a number of light functions can be generated in a space-saving manner. When viewed from the front of the lighting device, there is only one light emission surface formed of a flat light beam produced by a first light unit on the one hand and a linear light beam produced by the second light unit on the other. The light emission surface of the emitting flat light beam is limited by a deflection section of the first light unit and the intersection area, from which the second flat light guide projects in the main emission direction. The fact that a U-shaped light guide element is provided allows for a width of the flat light decoupling between the intersection area and the deflection area to be defined. The radiation of the linear light beam through the first light unit takes place in the direction of light guidance within the flat light guide, so that a defined luminous flux for the flat and linear light emission of the first light unit can be easily adjusted by forming coupling agents of the first light unit.

The U-shaped light guide element can have a relatively large vertex formed by the second section of the first light guide. A first leg is formed by a first section of the first light guide and a second leg by a first section of the second light guide. Advantageously, the light emission surface can be generated in a space-saving way, wherein the first leg and the second leg can run approximately parallel or at an acute opening angle in an extraction direction of an injection mold.

Narrow sides can be formed as light decoupling surfaces on one side of the extension sections of the first light guide and the second light guide facing away from the intersection area. This can advantageously generate two different linear light functions, which are preferably emitted at right angles. In particular, the extension section of the first light guide may be used to generate a side marker light that runs perpendicular to the direction of the light beam emerging from the second section of the first light guide in the direction of the vehicle's longitudinal axis.

An extension axis of the intersection area runs parallel to an extension of the linear light decouplings at the extension sections of the first light guide and the second light guide. The extension axis of the intersection area and the extension of the light coupling surfaces runs in a vertical direction.

The linear light decoupling at the extension sections of the first light guide and the second light guide can be carried out in the direction of a light guide of the first light guide and the second light guide, respectively. The advantage of this is that the light output is relatively high.

At least the second section of the first light guide can have a decoupling agent, so that light is decoupled from a front flat side of the second section to produce a specified light distribution. If necessary, further second decoupling agents may be provided, so that in addition or alternatively, the coupled light is generated according to a specified inscription or to create a logo on the second section of the first light guide. The illumination area can thus be used for information purposes.

An inclined surface can be provided in the deflection section of the first light guide, by means of which the coupled light is deflected by 90°. The inclined surface is preferably flat and arranged at an angle of between 40° and 50°, preferably 45°, to a direction of extension of the first and second sections of the first light guide. Preferably, the inclined surface has reflective optics elements or a mirrored surface.

Retaining arms for attaching the U-shaped light guide element to a housing of the lighting device can run along a narrow side of the first section of the first light guide and the second light guide on the light coupling side. In this way, a relatively large U-shaped light guide element can be kept stable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
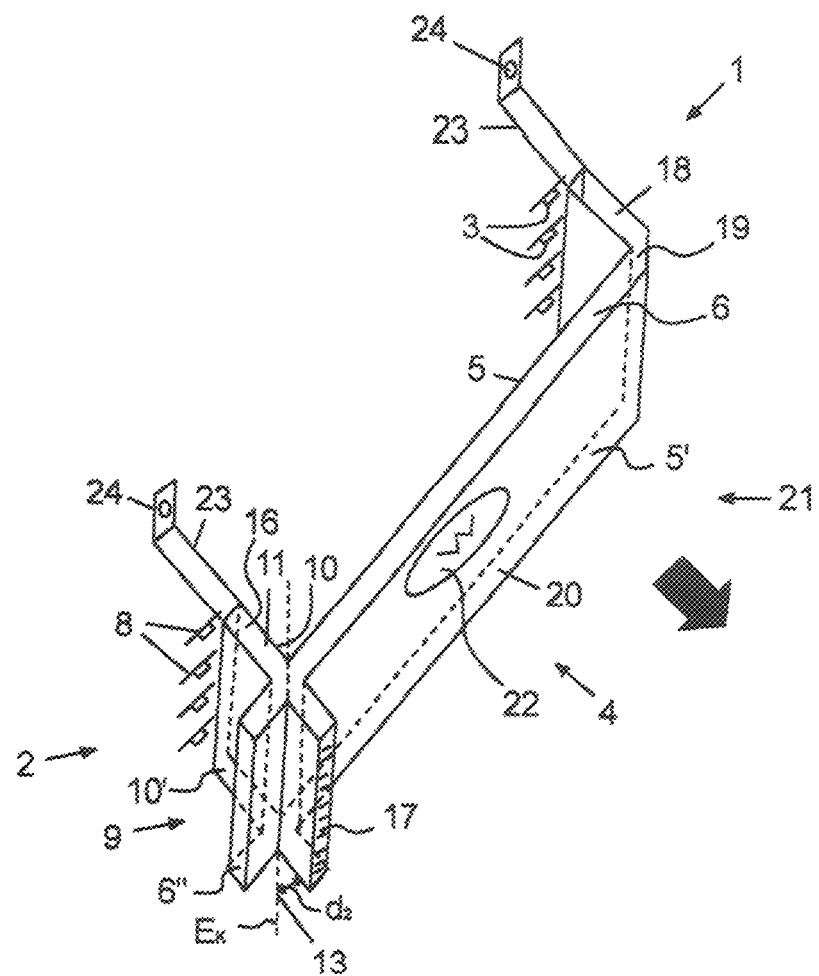
FIG. 1 shows a perspective representation of a lighting device according to the invention.
Figure 2:
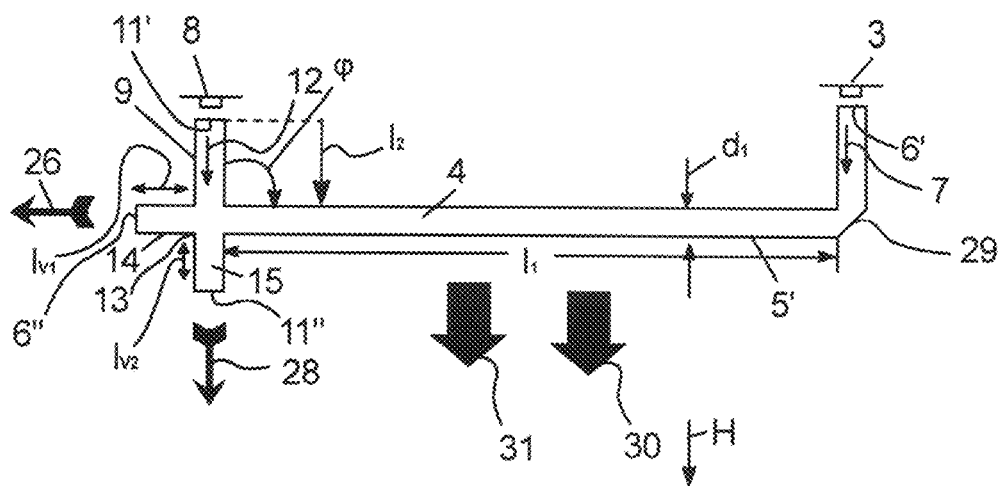
FIG. 2 shows a horizontal cut through the lighting device.

A lighting device for vehicles according to the invention can be used, for example, in the rear area to generate a taillight function, an outline light function and a side marker light function.

The lighting device according to the invention has a first light unit 1 and a second light unit 2, which independently produce a predetermined light distribution.

The first light unit 1 comprises a number of light sources 3 and a first flat light guide 4, which has two opposite flat sides 5, 5'. The opposite flat sides 5, 5' are connected to each other via a narrow side 6. At a first end of the first light guide 4, a narrow side 6 is formed as a linear light coupling surface. Several light sources 3 are arranged along the light coupling surface 6', so that a first light 7 is coupled to the light coupling surface 6' and passed along the opposite flat sides 5, 5' by total reflection in the direction of a linear light coupling surface 6" of the first light guide 4. The linear light coupling surface 6' can run in a straight line or in an arc shape, wherein the light sources 3 are arranged in a contour to the light coupling surface 6.

The second light unit 2 comprises light sources 8 and a second light guide 9, which has opposite flat sides 10, 10' and the same connecting narrow sides 11. A narrow side 11' of the second light guide 9 is formed as a linear light coupling surface, along which several light sources 8 are arranged in rows or elongated. The second light 12 emitted by the light sources 8 is coupled into the second light guide 9 through the light coupling surface 11' and is totally reflected on the opposite flat sides 10, 10' thereof in the direction of another narrow side 11, which is formed as a linear light decoupling surface 11". At the linear light decoupling surface 11", the second light 12 is decoupled.

The first light guide 4 and the second light guide 9 are designed in a single piece and are manufactured in particular as injection molded parts. In an intersection area 13, the parallel flat sides 5, 5' of the first light guide 4 cross with the flat sides 10, 10' of the second light guide 9. Since the intersection area 13 is arranged in an area of the first light guide 4 and the second light guide 9, which is only connected downstream to a comparatively short extension section 14 of the first light guide 4 and an extension section 15 of the second light guide 9, the proportion of light 7, 12 that is lost through diffusion in the intersecting other light guide 9 or 4 is relatively low. In particular, with regard to the first light guide 4, the extension section 14 has a much smaller length $l_{V1}$ than a length $l_1$ of a second section 20 of the first light guide 4, which is located upstream of the intersection area 13. The length $l_{V1}$ of the extension section 14 is less than 50%, preferably less than 30%, in particular less than 10% of the length $l_1$ of the second section 20 of the first light guide 4.

A length $l_{V2}$ of the extension section 15 of the second light guide 9 is less than a length $l_2$ of the first section 16 of the second light guide 9 running upstream of the intersection area 13.

The total length of the second light guide 9 is the sum of the length $l_2$ of the first section 16, the length $l_{V2}$ of the extension section 15 and the thickness d1 of the first light guide 4. Both the extension section 15 and the first section 16 of the second light guide 9 are arranged at an angle of 85° to 95° with respect to the second section 20 of the first light guide 4 passing through the intersection area 13 (intersection point), preferably not at a right angle, in order to enable extraction from an injection mold. The linear light decoupling surface 11" arranged opposite the linear light coupling surface 11" may have diffusion optics elements 17 for diffusing light decoupling according to a specified light distribution.

An area of the first light guide 4 arranged upstream of the intersection area 13 has a first flat section 18, which has the light coupling surface 6'. In the direction of luminous flux, the first section 18 is followed by a deflection section 19, where the coupled first light 7 is deflected by about 90° in the direction of the second section 20, which is flat and extends to the intersection area 13. The deflection section 19 has an inclined surface 29 at which the light 7 is deflected. The inclined surface 29 can have reflective optics elements or a mirrored surface.

The first section 18, the deflection section 19 and the second section 20 of the first light guide 4, together with the first section 16 of the second light guide 9, form a U-shaped light guide element 21 arranged in a plane running transversely to the linear light coupling surface 6', 11' of the first light guide 4 and the second light guide 9. The intersection area 13 is located in an area close to the light decoupling of the first light guide 4 and the second light guide 9. The second section 20 of the first light guide 4 forms a vertex of the U-shaped light guide element. The first section 18 and the deflection section 19 of the first light guide 4 form a first leg of the U-shaped light guide element 21. The first section 16 of the second light guide 9 forms a second leg of the U-shaped light guide element 21.

In the intersection area 13, the flat sides 5, 5' of the first light guide 4 and flat sides 10, 10' of the second light guide 9 continue in the same direction, wherein the flat sides 5, 5' and 10, 10' of the first light guide 4 and the second light guide 9 are alternately interrupted.

Preferably, the first light guide 4 and the second light guide 9 have a constant thickness $d_1$ or $d_2$, respectively, so that the interruption width of the respective flat sides 5, 5' of the first light guide 4 or flat sides 10, 10' of the second light guide 9 are the same in the intersection area 13.

The flat sides 5, 5' of the first light guide 4 and the flat sides 10, 10' of the second light guide 9 each run in a straight line in the direction of luminous flux towards the intersection area 13, enclosing an angle φ in the intersection area 13. Since the flat sides 5, 5' and 10, 10' of the first light guide 4 and the second light guide 9 respectively run in a straight line, the extension sections 14 of the first light guide 4 and extension sections 15 of the second light guide 9 also enclose the same angle φ to each other. Since in the present embodiment the flat sides 5, 5' or 10, 10' of the first light guide 4 and the second light guide 9 do not converge exactly perpendicularly towards each other, the opening angle φ is not 90°, but has a deviation of +/−5° from 90°.

An extension axis $E_K$ of the intersection area 13 runs parallel to an extension direction of the light coupling surfaces 6', 11' of the first and second light guides 4, 9 or parallel to the light decoupling surface 6", 11" of the extension sections 14, 15.

Between the deflection section 19 and the intersection area 13, in which the second section 20 of the first light guide 4 is located, decoupled agents are arranged in such a way that the light coupled into the first light guide 4 is decoupled on a front flat side 5' of the latter in the main emission direction H of the lighting device. The decoupled light 30 can be used, for example, to generate a taillight function. For example, elongated prism elements or diffusion elements may be arranged as coupling agents on the rear flat side 5 of the second section 20 of the first light guide 4. Alternatively, appropriate decoupling agents can also be arranged on the front flat side 5'.

In addition or alternatively, in the second section 20 of the first light guide 4, decoupling agents may be arranged in such a way that light 31 exits in the main emission direction H in accordance with a specified inscription or logo 22 on the front flat side 5'.

If the light beam emitted in the main emission direction H from the second section 20 of the first light guide 4 is to have the light function (taillight function) and the logo function, the first decoupling agents that cause the light function may lead to a different luminance of the decoupled light than the second decoupling agents responsible for the logo 22. In the present embodiment, the first decoupling agents are arranged over the entire surface of the second section 20, while the second decoupling agents for the representation of the logo 22 are arranged in some areas only in a part of the second section 20 of the first light guide, in which the logo 22 is supposed to be located.

For the support of the U-shaped light guide element 21, retaining arms 23 are arranged on one side facing the light sources 3, 8 as an extension on a narrow side of the first section of the light guide 4 and the second light guide 9 running towards the light coupling surface. At the end, the retaining arms 23 have mounting tabs 24 for attaching the U-shaped light guide element 21 to a housing of the lighting device.

The extension section 14 of the first light guide 4 has the linear light decoupling surface 6" on one side facing away from the intersection area 13, which can be used to generate a side marker light 26. The side marker light 26 is thus emitted essentially perpendicular to the taillight 30 or the outline light 28 and to the logo light 31.

The linear light decoupling surface 11" of the extension section 15 of the second light guide 9 arranged on a side facing away from the intersection area 13 can be used to generate an outline light function 28. This light of the outline light is emitted in the same direction (main emission direction H) as the taillight 30.

The invention can advantageously generate several light functions in a compact and space-saving manner.

The light sources 3, 8 are preferably designed as LED light sources, each of which is arranged on a circuit board. The light sources 3, 8 are arranged in a row.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle comprising:
   a first light unit having a light source and a first flat light guide having a linear light coupling surface and a light decoupling surface;
   a second light unit having a light source and a second flat light guide having a linear light coupling surface and a linear light decoupling surface,
   wherein the first flat light guide and the second flat light guide are connected to each other in a single piece to form a light guide element,
   wherein opposite flat sides of the first flat light guide intersect with opposite flat sides of the second flat light guide in an intersection area,
   wherein the first flat light guide has a deflection section between a first flat section and a second flat section of the first flat light guide,
   wherein the first flat light guide and the second flat light guide form a U-shaped light guide element in a transverse plane running transversely to the linear light coupling surface of the first flat light guide and of the second flat light guide,
   wherein an extension section of the first flat light guide and an extension section of the second flat light guide project from the intersection area at an angle, and
   wherein a narrow side of the extension section of the first flat light guide, that faces away from the intersection area, forms the linear light decoupling surface of the first flat light guide, and a narrow side of the extension section of the second flat light guide, that faces away from the intersection area, forms the linear light decoupling surface of the second flat light guide.

2. The lighting device according to claim 1, wherein the second flat section of the first flat light guide forms a vertex of the U-shaped light guide element, the first flat section of the first flat light guide forms a first leg and a first flat section of the second flat light guide forms a second leg of the U-shaped light guide element.

3. A lighting device for a vehicle comprising:
   a first light unit having a light source and a first flat light guide having a linear light coupling surface and a light decoupling surface;
   a second light unit having a light source and a second flat light guide having a linear light coupling surface and a linear light decoupling surface,
   wherein the first flat light guide and the second flat light guide are connected to each other in a single piece to form a light guide element,
   wherein opposite flat sides of the first flat light guide intersect with opposite flat sides of the second flat light guide in an intersection area,
   wherein the first flat light guide has a deflection section between a first flat section and a second flat section of the first flat light guide,
   wherein the first flat light guide and the second flat light guide form a U-shaped light guide element in a transverse plane running transversely to the linear light coupling surface of the first flat light guide and of the second flat light guide, wherein an extension section of the first flat light guide and an extension section of the second flat light guide project from the intersection area at an angle, and wherein the extension sections of the first and second flat light guides enclose an angle equal to an angle enclosed by the second flat section of the first flat light guide, running in a direction of luminous flux to the intersection area, and a first flat section of the second flat light guide.

4. The lighting device according to claim 3, wherein the angle enclosed between the extension sections of the first and second flat light guides is 90°.

5. A lighting device for a vehicle comprising:

a first light unit having a light source and a first flat light guide having a linear light coupling surface and a light decoupling surface;

a second light unit having a light source and a second flat light guide having a linear light coupling surface and a linear light decoupling surface, wherein the first flat light guide and the second flat light guide are connected to each other in a single piece to form a light guide element, wherein opposite flat sides of the first flat light guide intersect with opposite flat sides of the second flat light guide in an intersection area, wherein the first flat light guide has a deflection section between a first flat section and a second flat section of the first flat light guide, wherein the first flat light guide and the second flat light guide form a U-shaped light guide element in a transverse plane running transversely to the linear light coupling surface of the first flat light guide and of the second flat light guide, wherein an extension section of the first flat light guide and an extension section of the second flat light guide project from the intersection area at an angle, and wherein an extension axis of the intersection area runs substantially parallel to an extension direction of the linear light coupling surface of the first flat light guide and the linear light coupling surface of the second flat light guide.

6. The lighting device according to claim 5, wherein the extension axis of the intersection area runs in a vertical direction.

7. The lighting device according to claim 1, wherein the second flat section of the first flat light guide has decoupling agents such that coupled light is decoupled at a front flat side of the second flat section in a main emission direction in order to produce a predetermined light function.

8. The lighting device according to claim 7, wherein the decoupling agents are distributed in the second flat section of the first flat light guide such that light is decoupled over substantially an entire surface from of the second flat section of the first flat light guide in the main emission direction to generate the predetermined light function.

9. The lighting device according to claim 7, wherein in the second flat section of the first flat light guide, second decoupling agents are arranged only in sections such that light is decoupled at the front flat side of the first flat light guide to represent an inscription or logo.

10. The lighting device according to claim 1, wherein the deflection section of the first flat light guide has an inclined surface at which the coupled light is deflected.

11. The lighting device according to claim 10, wherein the inclined surface is level or provided with reflection optics elements and runs at an angle in a range of 40° to 50°, or at an angle of 45°, to an extension direction of the first flat section and the second flat section of the first flat light guide.

12. The lighting device according to claim 1, wherein a row of light sources is arranged at the linear light coupling surface of the first flat light guide and at the linear light coupling surface of the second flat light guide.

13. The lighting device according to claim 1, wherein a first retaining arm is molded to and extends from a narrow side of the first flat light guide that is connected to the light coupling surface of the first flat light guide, and a second retaining arm is molded to and extends from a narrow side of the second flat light guide that is connected to the light coupling surface of the second flat light guide, the first and second retaining arms being provided for attaching the U-shaped light guide element to a housing of the lighting device.

14. The lighting device according to claim 1, wherein the second flat section of the first flat light guide is substantially perpendicular to the first flat section of the first flat light guide and substantially perpendicular to the second flat light guide.

* * * * *